United States Patent [19]

Taylor

[11] Patent Number: 4,748,366
[45] Date of Patent: May 31, 1988

[54] NOVEL USES OF PIEZOELECTRIC MATERIALS FOR CREATING OPTICAL EFFECTS

[76] Inventor: George W. Taylor, 305 Dodds La., Princeton, N.J. 08540

[21] Appl. No.: 904,019

[22] Filed: Sep. 2, 1986

[51] Int. Cl.$^4$ .................................... H01L 41/08
[52] U.S. Cl. ..................... 310/328; 310/311; 310/339; 310/800; 446/47; 446/485; 36/137
[58] Field of Search ............... 310/311, 338, 339, 800; 446/34, 47, 140, 219, 485; 128/382; 36/1, 25 R, 87, 102, 103, 136, 137

[56] References Cited

U.S. PATENT DOCUMENTS

| | | | |
|---|---|---|---|
| 2,816,236 | 12/1957 | Rosen | 310/311 X |
| 2,951,168 | 8/1960 | Yando | 310/311 X |
| 3,339,104 | 8/1967 | Kushner et al. | 310/339 X |
| 3,392,979 | 7/1968 | Wilska | 310/339 X |
| 3,690,661 | 9/1972 | Scharz | 310/328 X |
| 3,786,246 | 1/1974 | Johnson et al. | 446/47 |
| 3,808,418 | 4/1974 | Conard et al. | 310/339 X |
| 3,931,514 | 9/1976 | Patterson | 310/339 X |
| 4,190,785 | 12/1980 | Kompanek | 310/311 X |
| 4,204,357 | 5/1980 | Harrington | 446/47 |
| 4,387,318 | 6/1983 | Kolm et al. | 310/330 |
| 4,499,394 | 2/1985 | Koal | 310/800 X |
| 4,516,112 | 5/1985 | Chen | 310/311 X |
| 4,521,712 | 6/1985 | Braun et al. | 310/339 |
| 4,523,261 | 6/1985 | West | 310/339 X |
| 4,536,674 | 8/1985 | Schmidt | 310/339 X |
| 4,542,445 | 9/1985 | Marletta | 446/485 X |
| 4,618,797 | 10/1986 | Cline | 310/339 |

FOREIGN PATENT DOCUMENTS

1555306  1/1969  France ................... 36/137

*Primary Examiner*—Mark O. Budd
*Attorney, Agent, or Firm*—Michael Y. Epstein

[57] ABSTRACT

An optical effect is produced in cooperation with the normal use of an article of manufacture, e.g., a toy such as a frisbee or a ball, or an article of clothing, such as a shoe, by mounting on the article a piezoelectric element for generating electrical energy in response to movement of the article and an optical effect device, such as a neon bulb, gas plasma, liquid crystal, or electroluminescent device, electrically connected to and energized by the element in response to such movement. In one embodiment, the element and device each comprises a thin, layer-like structure, the element and device structures being laminated or attached together.

5 Claims, 6 Drawing Sheets

NOVEL USES OF PIEZOELECTRIC MATERIALS FOR CREATING OPTICAL EFFECTS

BACKGROUND OF THE INVENTION

This invention relates to novel uses of piezoelectric materials, and particularly to the use of such materials for producing generally novel optical effects, either for pleasure or utility, in generally common-place articles of manufacture.

The piezoelectric effect, in which a piezoelectric material converts mechanical energy to electrical energy (and vice versa), is well known. Recently, however, polymer piezoelectric materials have been developed which have the advantages of being relatively inexpensive, physically stable and strong, and manufacturable in a great variety of shapes and sizes, particularly as flexible thin sheets having electrodes on the opposite major surfaces of the sheets. The present invention is directed to using piezoelectric materials, particularly in the electroded sheet form, in connection with various common articles of manufacture, e.g., shoes, targets, and various toys, for producing novel optical effects during use of the articles.

SUMMARY OF THE INVENTION

A piezoelectric material element, preferrably in the form of an electroded sheet of piezoelectric material, is incorporated into an article of manufacture in such fashion that, during use of such article, mechanical energy is imparted to the piezoelectric element, e.g., as by repeatedly flexing it, to cause the generation of an electrical voltage between the element electrodes. The voltage, and attendant electrical energy, is transferred to an optical effect device to produce an optical effect in response to the use of the article.

DESCRIPTION OF THE DRAWINGS

FIG. 1f is a cross-sectional view of a more integrated version of the basic laminate structure of FIG. 1a;

DETAILED DESCRIPTION

A large number of materials are known which display the piezoelectric effect. While not limited specifically thereto, the present invention, in its preferred forms, uses commercially available thin sheets of the polymer piezoelectric material known as Polyvinylidene Fluoride ($PVF_2$), having film electrodes, e.g., of indium oxide on the opposite major surfaces of the sheets. Typical thicknesses of the $PVF_2$ sheets are in the range of 10 μm to 2.0 mm, and those of the electrodes 500 Å to 5000 Å. Both the $PVF_2$ material and the indium oxide electrodes are transparent, as is desirable in various applications hereinafter described. Other materials for the electrodes, transparent or not, can be used, e.g., aluminum, tin, nickel or chrome. Also, other piezoelectric materials can be used, particularly commercially available "composite" materials, e.g., particles of known ceramic piezoelectric materials embedded in host layers, e.g., of inert polymers, rubber or $PVF_2$ material.

In general, piezoelectric materials used according to this invention are high voltage, low current devices. The amplitude of the voltage generated is a function of the thickness of the piezoelectric sheet, and the current is a function of the electroded area of the piezoelectric sheet. Thus the total power and energy generated is a function of the volume of the piezoelectric material. The amount of electrical energy, $U_E$, generated by the application of $U_M$ units of mechanical energy to a piece of piezoelectric material is given by the expression $$U_E = k^2 U_M$$

where k is the coupling coefficient. The value of k is dependent on the particular piezoelectric material used, its geometry and the mode of operation (i.e. stretching, compressing, twisting, etc.) used. These factors are well known.

The electrical output characteristics of such piezoelectric elements are compatible with various known light generating devices. e.g., electroluminescent materials, gas discharge (plasma) panels, and neon bulbs, all of which require alternating high voltage, low current sources to energize them. By "energize", it is meant that the devices are caused to at least flash on and off, such light flashing generally being the intended optical effect.

Included in the concept of optical effect devices are liquid crystal devices which do not generate light but which, as known, provide variable optical effects owing to changes in the light transmitting, reflecting, or scattering characteristics of the devices depending upon the particular devices used. Such liquid crystal devices also require alternating voltage, low current activation, hence are compatible with piezoelectric element energy sources.

In general, various known optical effect devices, such as electroluminscent, liquid crystal, gas plasma, electrophoretic and electrochromic, can be provided in thin sheet form suitable for attachment to an electroded sheet of piezoelectric material, and resulting structure comprising a thin, sheet-like mechanical energy to optical effect laminate which has utility in many applications in accordance with this invention.

Figure 1A:
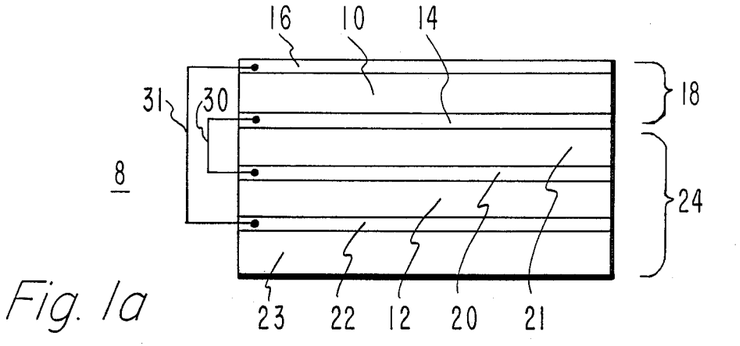
FIG. 1a is a cross-sectional view of a basic laminate structure comprising a piezoelectric element and an optical effect device.

FIG. 1a shows a general form of such a laminate 8, wherein layer 10 is the piezoelectric material and layers 14 and 16, are the electrodes associated with the piezoelectric element 18 (i.e., comprising layers 10, 14 and 16), and layer 12 is the optical effect portion of an optical effect device in which layers 20 and 22 are electrodes and layers 21 and 23 are plastic or glass layers that enclose the optical effect layer 12. The complete optical effect device 24 comprises layers 21, 20, 12, 22 and 23. In this structure, the electrode 14 of the element 18 is contiguous with, and bonded to, as by an epoxy cement, the layer 21 of the device 24. Electrodes 14 and 20 of the element and device, respectively, are electrically interconnected by a wire 30, and electrodes 16 and 22 of the element and device, respectively, are electrically interconnected by a wire 31.

In use, flexure of the piezoelectric element 18 (generally as part of flexure of the entire laminate 8) results in the generation, in proportion to and immediately in response to such flexure, of a voltage by the element 18 and the activation of the device 24 by such voltage.

Depending upon the particular element and device used, laminates 8 having thickness in the range of 2 mm to 15 mm are available using commercially available products. The laminate 8 can, depending upon its components, be quite flexible, strong and stable. Also, as desired, the optical effects can be visible only from the device 24 side of the laminate or, using transparent materials throughout, from either side of the laminate.

The exact structural configuration of the optical effect device 24 and its interconnection to the piezoelectric element 18 will vary depending on the particular type of optical effect device use. Examples of such variations are now described.

Figure 1B:
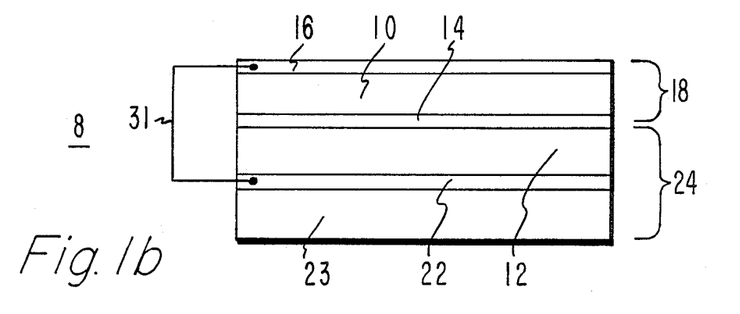
FIG. 1b is a cross-sectional view of a laminate structure comprising a piezoelectric element and an electroluminscent optical effect device.

FIG. 1b shows one known form of an electroluminescent optical effect device 24 in which the electroluminescent optical effect material 12 is sandwiched between the piezoelectric element electrode 14 and the bottom optical effect device electrode 22. An advantage of the scheme of FIG. 1b over that of FIG. 1a is that it obviates the need for the layer 21 and uses a single electrode 14 rather than the two electrodes 14 and 20 and their connecting wire 30. An example of a suitable electroluminscent phosphor material is Mn doped ZnS powder. In some instances the electroluminiscent phosphor material is preferably surrounded on both sides of an insulator material such as $SrTiO_3$ or $Y_2O_3$ which is provided as a layer (not shown) on the inside or facing surfaces of electrodes 22 and 14. Electroluminescent devices are operated generally in a light emitting mode and, to this end, one of electrodes 14 or 22 is reflective and the other is transparent.

Figure 1C:
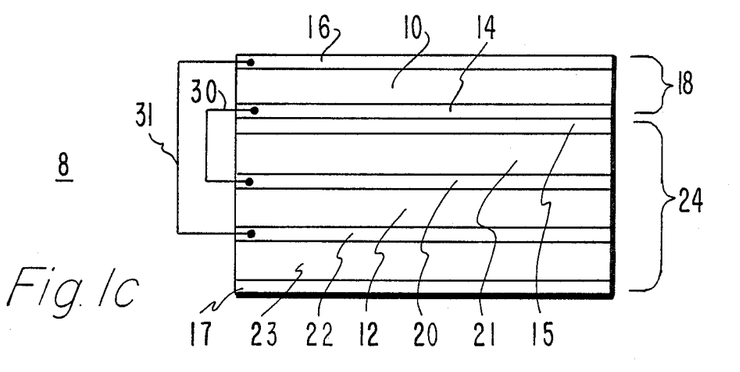
FIG. 1c is a cross-sectional view of a laminate structure comprising a piezoelectric element and a twisted nematic liquid crystal optical effect device.

FIG. 1c shows one known form of a liquid crystal optical effect device 24 comprising optical polarizers 15 and 17, enclosing layers 21 and 23, and a twisted nematic liquid crystal material as the optical effect portion 12. Electrodes 20 and 22 are disposed on the inside or facing surfaces of the layers 21 and 23, respectively. The contiguous layer 14 of the piezoelectric element and the polarizer 15 of the optical effect device are bonded together by, for example, an epoxy cement. If the optical effect device 24 is to be operated in the so called optically transmitting mode, then all the electrodes 16, 14, 20 and 22 of the laminate 8 are transparent. Alternatively, if the optical effect device 24 is to be operated in the reflective mode, being viewed, for example, from the polarizer 17 side of the laminate 8, then electrodes 20 and 22 and plastic layers 21 and 23 are transparent, and electrode 14 is reflective.

In a different arrangement, polarizer 15 can be disposed on the outer side of electrode 16. In such case, all layers between the polarizer 15 and the twisted nematic optical effect portion 12 are tranparent. Also, if the reflective mode is used, an additional reflective layer is added to one of the outer sides of the laminate 8.

Other liquid crystal operating modes, such as, but not limited to, dynamic scattering, field induced birefringence and cooperative alignment of dye molecules, can be used. If the dynamic scattering mode is used, the optical polarizers 15 and 17 are omitted.

Figure 1D:
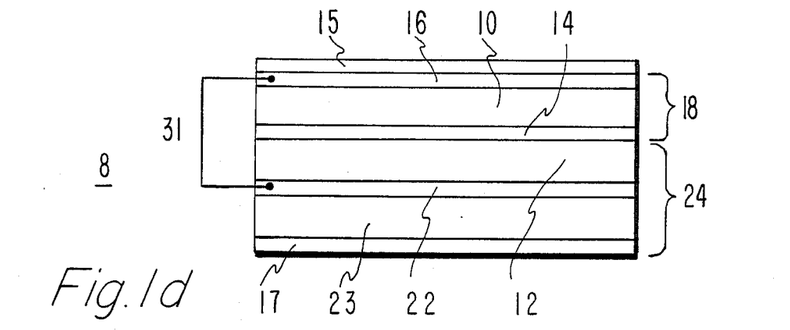
FIG. 1d is a cross-sectional view of a variation on and a simplification of the laminate structure of FIG. 1c.

FIG. 1d shows a further variation and simplification of the scheme of FIG. 1c. In FIG. 1d, the polarizer 15 is placed on the outer side of electrode 16, and the piezoelectric material 10 and its electrode 14 also serve as the enclosing layer and an electrode for the twisted nematic liquid crystal. An advantage of the scheme of FIG. 1d is that it obviates the need for the layers 21 and 20 and interconnection 30 used in the FIG. 1c arrangement.

Figure 1E:
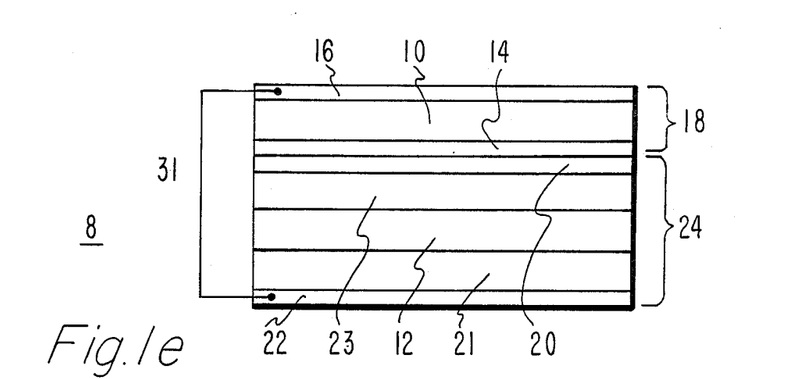
FIG. 1e is a cross-sectional view of a laminate structure comprising a piezoelectric element and a gas plasma optical effect device.

FIG. 1e shows one known form of an ac coupled gas plasma optical effect device in which the optical effect portion 12 is, for example, neon gas with suitable trace elements added. The electrodes 20 and 22 are not in contact with the optical effect portion 12 as is previously described optical effect devices, but instead are on the outer surfaces of the enclosing layers 21 and 23. Layers 21 and 23 can be plastic but are preferably made from thin flexible glass. The continguous electrode layers 14 and 20 of the element and device, respectively, are bonded together, for example, with a conductive epoxy cement. If, for example, the optical effect portion 12 of this arrangement is to be viewed from the side 22 of the laminate 8, then electrode 22 is transparent and electrode 20 is reflective, and while electrodes 14 and 16 can be either transparent or reflective.

Figure 1F:
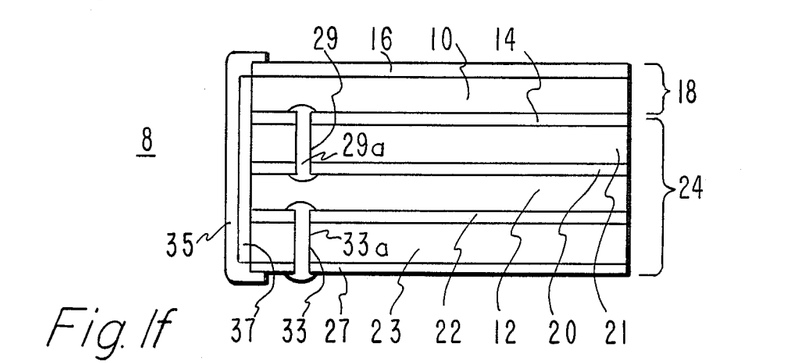

FIG. 1f shows how the external electrical wire connections 30 and 31 of the laminate structure of FIG. 1a can be more effectively integrated into the structure. In FIG. 1f, the electrical connection between electrode 14 and electrode 20 is made by means of an electrically conductive plated hole 29 through the layer 21. Electrical connection between the plated hole 29 and electrodes 14 and 20 is made by means of a conductive epoxy, silver paste or solder plug 29a. Also, an electrode layer 27 is provided on the outer surface of the layer 23 and an electrically conductive plated hole 33 is formed through layer 23. Electrical connection between the plated hole 33 and electrodes 22 and 27 is made by means of a conductive epoxy, silver paste or solder plug 33a. The outer electrode 16 is electrically connected to the outer electrode 27 by an electrically conductive layer 35 formed on one edge of the laminate 8. One means for forming layer 35 is to first form an electrically insulating layer 37, by, for example, evaporating silicon dioxide, on the edge of the laminate 8 and to then form on layer 37, as by electroplating, metallic evaporation, or sputtering, the electrically conductive layer 35.

A desirable feature of each of the aforedescribed embodiments is that the output of the piezoelectric element is directly coupled to the optical effect device. No intervening circuitry, buffers or batteries are needed.

Figure 2:
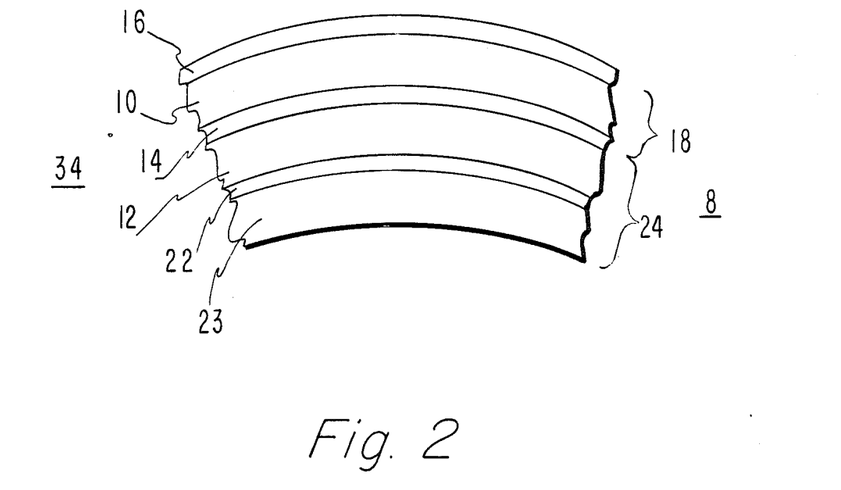
FIG. 2 is a partial view in cross-section of a ball made from a laminate structure of the type shown in FIG. 1b.

FIG. 2 shows an article of manufacture, a child's ball 34, made entirely (but not necessarily) from a laminate such as the one shown in FIG. 1b which, in this case, is formed, using known techniques for making plastic balls, into a sphere. Because, in this instance, the piezoelectric material, e.g., the $PVF_2$, is likely stronger and more wear resistant than any of the aforementioned optical devices which might be used in the laminate, the element 18 side of the laminate 8 is used as the outside surface of the ball.

In use, each time the ball is impacted, as by being bounced or hit by a bat or the like, an optical effect is produced, e.g., a light flash, in the case of the use of a light producing device, or a change in coloration, generally white to black and vice-versa, in the case of the use of a liquid crystal device.

Figure 3:
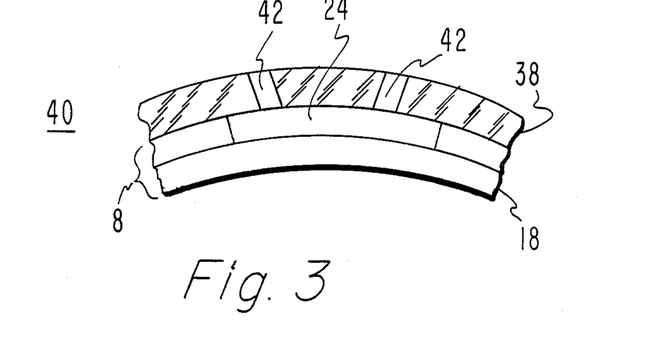
FIG. 3 is a partial view, in cross-section, of a ball using a different structure.

The ball 34, as described, is light weight and fragile, i.e., suitable as a child's toy. Various modifications are possible to make more rugged balls. For example, the ball outer surface can be coated with a transparent film or layer, e.g., of a known epoxy, to protect the outer electrode 16 of the laminate. Alternatively, as shown in FIG. 3, a laminate structure 8 can be embedded within or bonded to the inside of the usual wall structure 38 of a ball, e.g., a baseball 40, and small openings 42 provided through the wall to expose to view the optical effect produced by the structure 8. Because only small portions of the laminate 8 are visible, the optical effect portion of the laminate is preferrably reduced in size, being present only in the area where visible through the ball wall. Thus, in this embodiment, the piezoelectric element 18 is much larger than the optical effect device 24 (the large element being retained for greater energy output), and the combination of piezoelectric element and optical device is a "laminate" only over a portion thereof.

Figure 4:
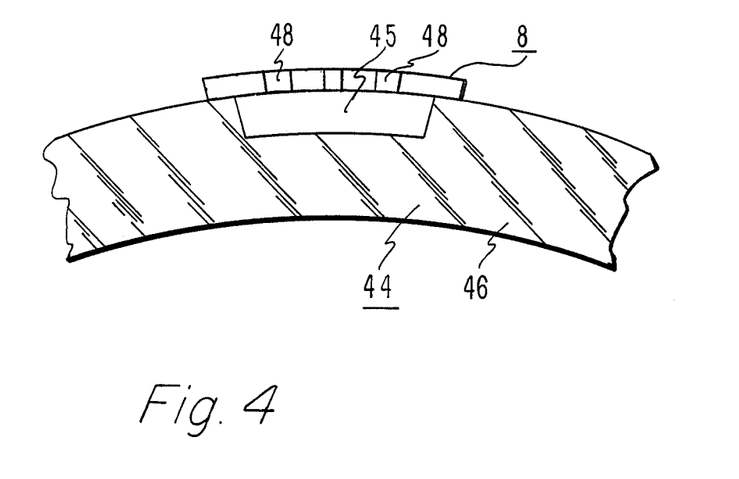
FIG. 4 is a cross-sectional view of a portion of a frisbee using a laminate structure.

FIG. 4 shows the use of a laminate 8 mounted on a frisbee 44 for interaction with the surrounding air as the frisbee sails through the air, generally with a high rate of rotation and/or wobble. In this application, the laminate 8 is preferrably free to move independently of the frisbee so as to absorb mechanical energy from the air. To this end, in this illustrative use, the laminate 8 is stretched over a cavity 45 in the shell 46 of the frisbee, and openings 48 are provided through the laminate to introduce turbulence in the passage of the air around the laminate, thereby causing movement of and driving of the piezoelectric element. Other means for causing interaction between the laminate and the air are flopping or flexing of the frisbee.

Laminates 8 can be used with a variety of other moving objects; for example they can be placed in the flapping tail of a kite for interaction with the surrounding air as the kite sails or soars. Similarly laminates 8 can be placed on streamers or flags that flap in the wind and which in the course of so doing produce flashing optical effects.

Laminates 8 can also be used with objects that are moving in fluids other then air. For example, a laminate 8 can be used on an object such as a boat moving in water for producing interesting visual effects or as part of a streamer in a gas flow as a means to optically indicate the flow of the gas.

Figure 5:
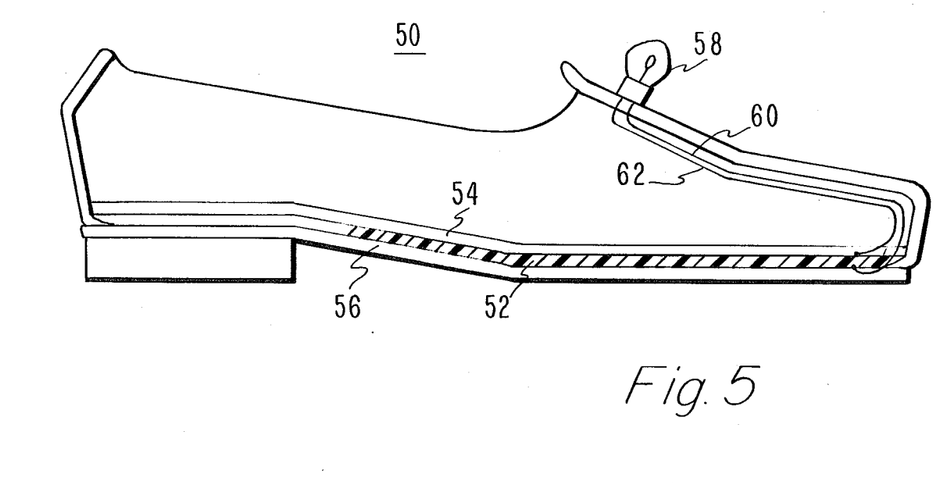
FIG. 5 is a cross-sectional view of a shoe incorporating an optical-effect arrangement according to the invention.

FIG. 5 shows still another embodiment of the invention, a flashing shoe 50 (e.g., used for dancing), in which the piezoelectric element and the optical device are not integrated as in the previously described laminate structures. As shown, an electroded piezoelectric layer 52 is disposed between the inner 54 and outer 56 soles of the shoe (although the layer 52 can be combined with one or the other in structure and function) and an optical effect device, e.g., a neon bulb 58, is mounted (as by threading terminal wires 60 of the bulb through holes through the shoe shell) on an upper and visible portion of the shoe. Wires 62 extend within the shoe (e.g., taped in place against the inside surface of the shoe) from the two element electrodes to the bulb terminals 60. Flexture of the layer 52, and the generation of electrical energy, occurs upon use of the shoe in normal fashion.

Figure 6:
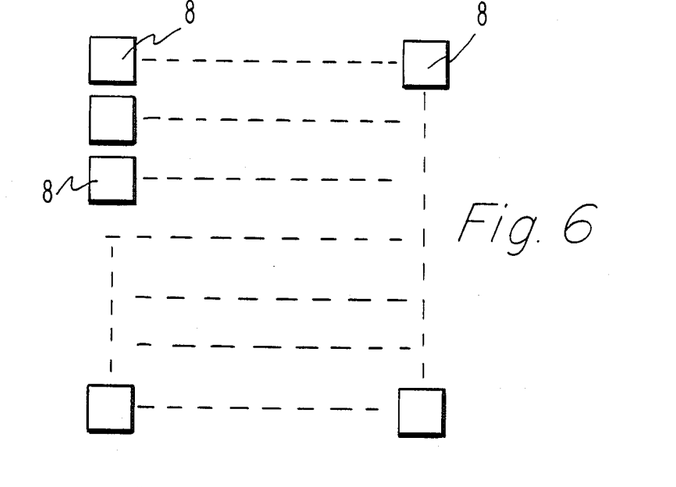
FIGS. 6 and 7 are front and cross-sectional views, respectively, of a target according to the invention.
Figure 7:
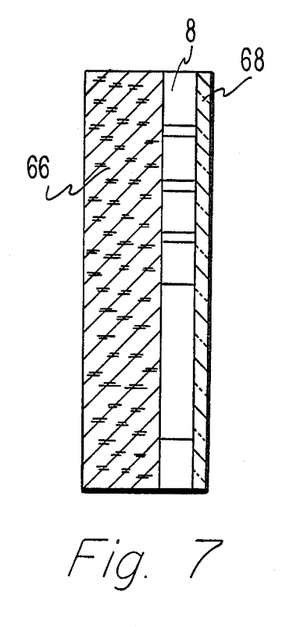

FIGS. 6 and 7 show a target structure, e.g., a dart board, comprising a mosaic of slightly spread apart laminate structures 8 mounted on an energy absorbing member 66, e.g., a cork board, for the purpose of (at least to some extent) mechanically isolating the different laminate structures from one another. The front surfaces of the laminates are covered by a common transparent target surface 68 against which missiles, e.g., blunt headed darts or bullets, or a water stream from a water pistol, are directed. In use, the laminate 8 directly opposite the point of missile impact, as well as the immediately surrounding laminates (depending upon the mounting arrangement and the missile impact), yield a flash of light or change in coloration to show the target impact point. Although individual, small, rectangular laminate structures are shown, larger laminate structures having desired shapes, e.g., concentricly disposed, annular shapes, plus a central, circular shape, defining a bulls-eye target pattern, can be used.

Figure 8:
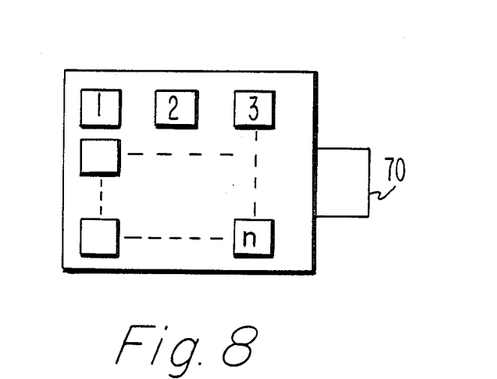
FIG. 8 is a front view of a display board for use in conjunction with the target shown in FIGS. 6 and 7.

In an alternative arrangement, the target laminates can be replaced with similarly shaped and mounted piezoelectric elements (i.e., not integrated with optical effect devices), each element being electrically wired to a corresponding optical effect device, e.g., a neon bulb mounted on a common board (FIG. 8) remote from the target. Thus, upon impact of a missile against the target and a corresponding generation of an electrical pulse by the element or elements disposed most immediately adjacent to the point of impact, the optical effect device or devices wired to such element or elements is or are caused to procude a visible optical effect. If desired, the electrical pulses produced by the missile impacts can be used to trigger known switching devices for providing a stored record of the various points of impact.

To provide greater accuracy of determination of the point of impact, known means (indicated generally by the box 70 in FIG. 8) can be used to compare the amplitudes of the electrical pulses generated by the different elements in response to an impact, and only the greatest amplitude pulse (generated by the element closest to the point of impact) is used to produce a read-out.

I claim:

1. In combination, an article of manufacture the use of which involves movement thereof, and a transducer mounted on said article for generating an optical effect in response to such movements, said transducer comprising a laminate structure including an electroded layer of piezoelectric material and an electroded layer of an optical effect device, each of two electrodes of said piezoelectric layer being electrically connected to a different one of two electrodes of said device, said article being a ball, the wall thereof comprising said laminate.

2. An optical effect producing frisbee including a piezoelectric element mounted thereon for interaction with the passing air during flight of the frisbee for generating electrical energy, and an optical effect device mounted on said frisbee and electrically connected to and energized by said element for producing a visible optical effect during such flight, said element and said device comprising a laminate structure including an electroded layer of a piezoelectric material and an electroded layer of an optical effect device, each of two electrodes of said piezoelectric layer being electrically connected to a different one of two electrodes of said device.

3. A combination according to claim 1, the wall of said ball consisting essentially of said laminate.

4. A combination according to claim 1, said laminate being disposed on an inside surface of the ball wall, openings being provided through said wall exposing to view said optical effect device.

5. A frisbee according to claim 2 including means for inducing turbulence in the passage of air around said laminate.

* * * * *